United States Patent [19]

Pecot et al.

[11] Patent Number: 4,989,991
[45] Date of Patent: Feb. 5, 1991

[54] EMISSIVITY CALIBRATION APPARATUS AND METHOD

[75] Inventors: Michel Pecot, Palo Alto; Jaim Nulman, Sunnyvale, both of Calif.

[73] Assignee: AG Processing Technologies, Inc., Sunnyvale, Calif.

[21] Appl. No.: 365,678

[22] Filed: Jun. 12, 1989

Related U.S. Application Data

[62] Division of Ser. No. 114,542, Oct. 26, 1987, Pat. No. 4,854,727.

[51] Int. Cl.$^5$ .......................... G01J 5/12; G01N 25/00
[52] U.S. Cl. ................................. 374/133; 324/158 F; 357/29; 374/57; 392/407
[58] Field of Search .................... 374/57, 132, 133, 9, 374/178, 2, 130; 219/350; 324/158 F

[56] References Cited

U.S. PATENT DOCUMENTS

| | | | |
|---|---|---|---|
| 3,277,715 | 10/1966 | Vanderschmidt | 374/9 |
| 3,842,346 | 10/1974 | Bobbitt | 324/158 F |
| 4,503,335 | 3/1985 | Takahashi | 324/158 F |
| 4,746,857 | 5/1988 | Sakai et al. | 324/158 F |

FOREIGN PATENT DOCUMENTS

| | | | |
|---|---|---|---|
| 0098402 | 1/1984 | European Pat. Off. | 374/133 |
| 0162028 | 12/1980 | Japan | 374/9 |
| 0130834 | 6/1986 | Japan | 374/133 |

Primary Examiner—Daniel M. Yasich
Attorney, Agent, or Firm—A. C. Smith

[57] ABSTRACT

An improved method and apparatus are disclosed for calibrating the emissivity characteristics of a semiconductor wafer within a processing chamber by supporting a sample wafer on a graphite susceptor within the chamber and by comparing the temperature measured within the susceptor in close proximity to the center of the wafer with the temperature measured by the emission of radiation from the surface of the wafer through the walls of the processing chamber. Temperature measurements subsequently made from the radiation emitted from the surface of similar wafers are corrected with reference to the measurement made of the temperature within the susceptor on the sample wafer.

4 Claims, 3 Drawing Sheets

EMISSIVITY CALIBRATION APPARATUS AND METHOD

CROSS REFERENCE TO RELATED APPLICATION

This is a division of application Ser. No. 114,542, filed Oct. 26, 1987, now issued as U.S. Pat. No. 4,854,727.

BACKGROUND AND SUMMARY OF THE INVENTION

This invention pertains to the apparatus and method for calibrating the thermal emissivity of semiconductor wafers, and more particularly to a sample-calibrating susceptor and method that holds a sample wafer while measuring its surface temperature by conduction and radiation sensors. Once correlated, these measurements are the basis for correcting the radiative measurements of surface temperature of similar wafers in a production-processing environment.

Contemporary flash-annealing processes on semiconductor wafers rely upon high-intensity sources of non-coherent light to irradiate the surface of the wafer and thereby rapidly heat the wafer from the surface, or surfaces. This process may take place within a reaction tube of quartz which confines the wafer within a controlled atmosphere of selected gases and which transmits the high-intensity light flux from the external light sources, through the walls of the quartz tube, to the surface(s) of the wafer. In the past, it has been difficult to determine with requisite degrees of accuracy the actual temperature at the surface of the wafer that is rapidly heated in this manner. The problem of measuring surface-temperature of a wafer is further complicated by the myriad different circuit patterns which may be formed using layers of diverse material assembled in complex arrays on the surface that is to be irradiated. The absorptive properties of the semiconductor material that forms the wafer, as well as the surface emissivity of the wafer, can be significantly altered by such circuit patterns on the surface. This contributes to substantial temperature errors in open-loop heating systems which supply a given level of radiation for a timed interval, and also contribute to substantial errors when surface temperature is determined by optically sensing the thermally-emitted radiation.

In accordance with the present invention, an improved susceptor supports a sampler wafer within a processing chamber in exactly the same conditions therein in which subsequent wafers are to be processed. The susceptor includes a graphite support element for a sample wafer with a temperature-sensing element such as a thermocouple positioned therein to be closely proximate the center of the sample wafer that is held to the susceptor by vacuum. The susceptor has approximately the same diameter as the wafer and a thickness that is typically not greater than about six times the thickness dimension of a sample wafer. This assures reasonably prompt thermal equilibration of susceptor and sample wafer under conditions within a processing chamber of irradiation from high-intensity non-coherent light sources that are positioned outside the chamber. Thus, a thermal sensor within the susceptor in high thermally conductive contact with the sample wafer accurately measures the actual temperature of the wafer (and therefore, of its surface) under conditions of spacing from the walls of the chamber, atmosphere within the chamber, circuit arrays on the surface, and the like, that will be similar for all subsequent similar wafers to be processed within the chamber.

At the same time, the surface temperature of the sample wafer is detected, for example, by an optical pyrometer which senses radiation from the sample wafer (and from the walls of the processing chamber, and from other radiative sources within the field of view of the pyrometer). The measurement of temperature by optical pyrometry can therefore be correlated with the measurement by thermocouple of the actual temperature of the sample wafer in order to correct the pyrometer reading. Thereafter, subsequent radiative temperature measurements of similar wafers within the processing chamber under substantially identical conditions to those employed in thermally measuring the temperature of the sample wafer greatly improves the speed and accuracy of the measurements of temperatures of similar wafers being processed within chamber.

DESCRIPTION OF THE PREFERRED EMBODIMENT

Figure 1:
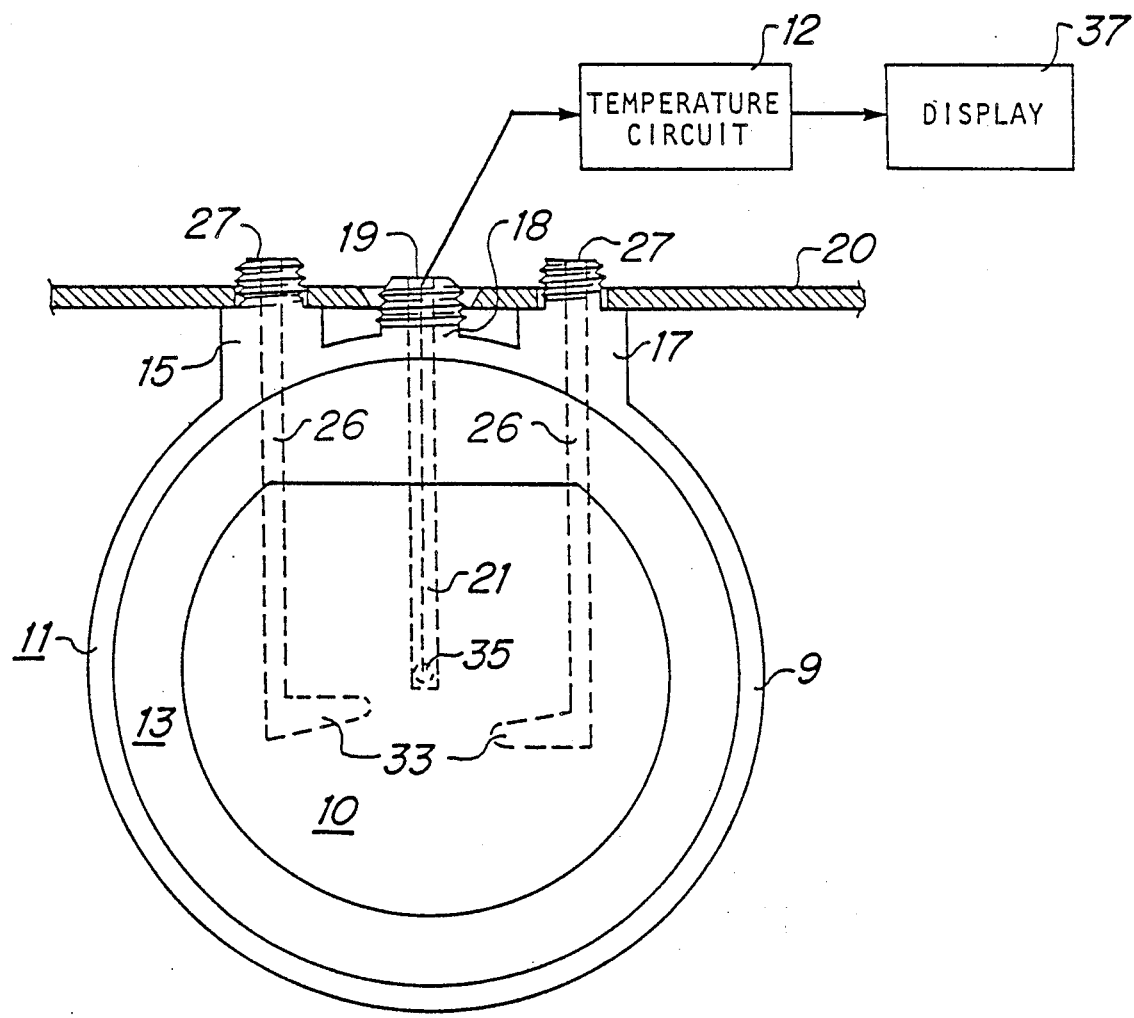
FIG. 1 is a plan view of the susceptor according to the present inventor.
Figure 2:
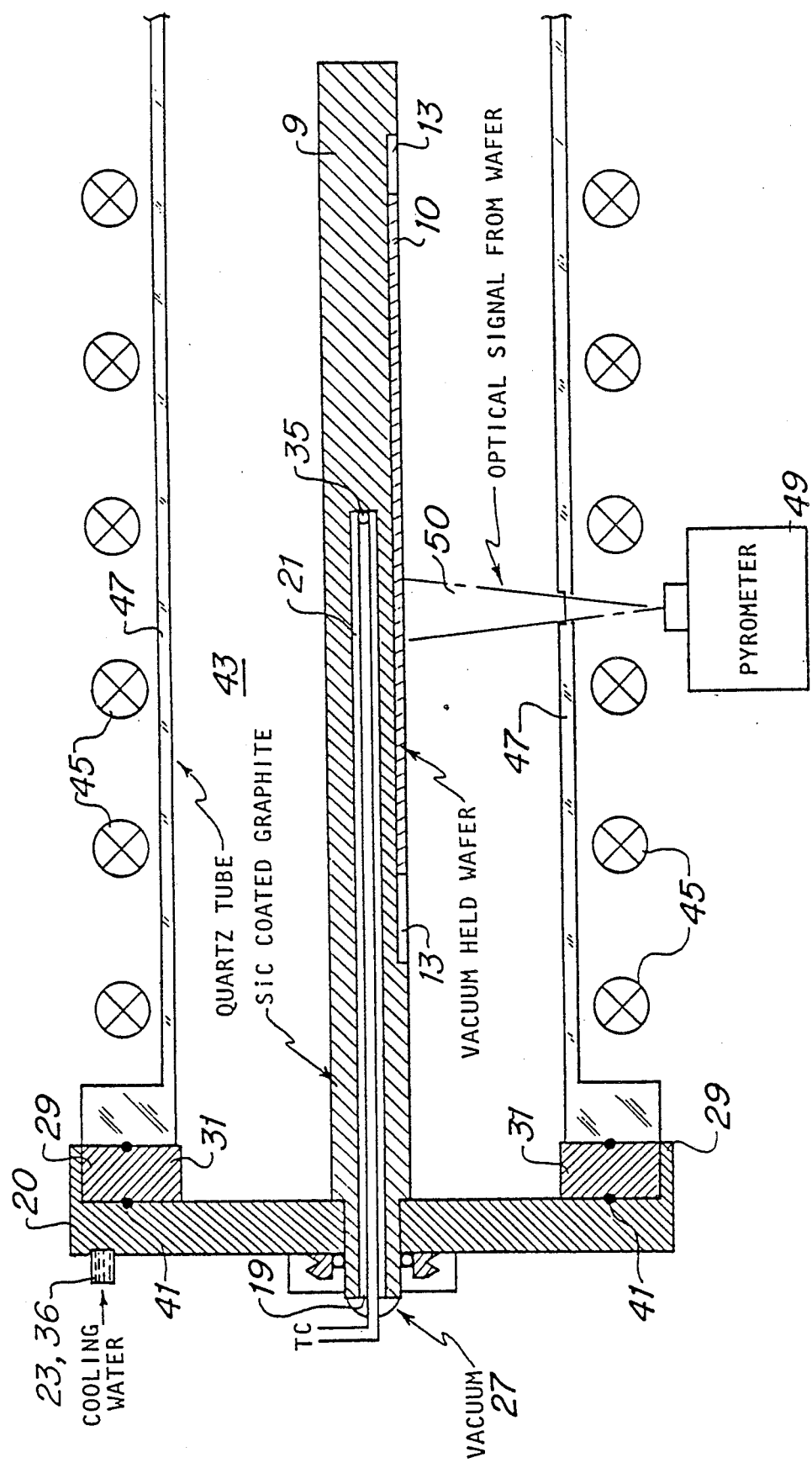
FIG. 2 is a sectional view of the susceptor of FIG. 1 supporting a sample wafer within a processing chamber.
Figure 3:
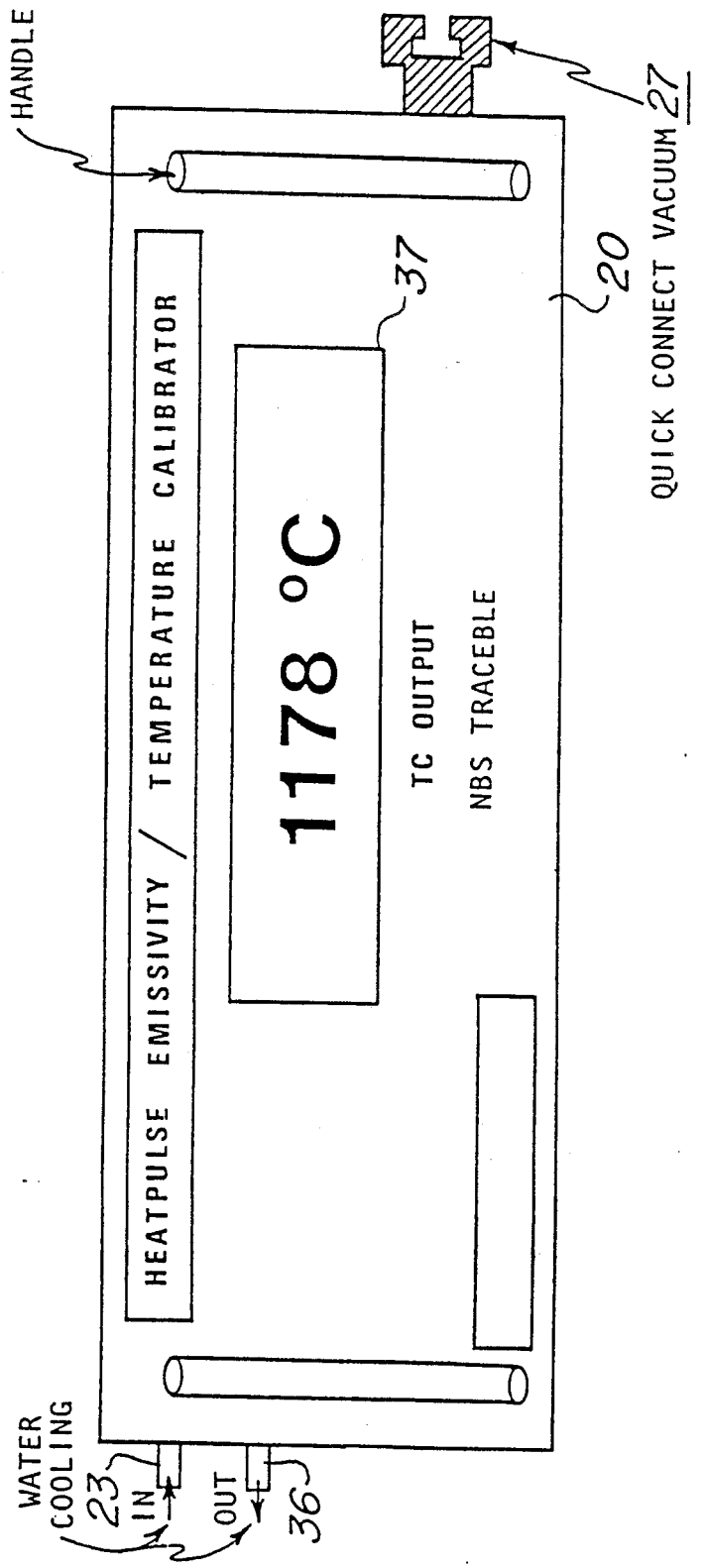
FIG. 3 is a front view of the calibrating apparatus according to the present invention.

Referring now to FIG. 1, there is shown a susceptor 9 according to the present invention which is preferably formed of graphite and coated with silicon carbide or silicon nitride to assure inert, non-reactive operation within a semiconductor processing chamber. The susceptor 9 is generally formed in approximately the same overall diameter as the wafer 10 it is intended to support, with small additional overhang 11 beyond the wafer consistent with need for support of the wafer is a recessed region 13. The susceptor 9 is ideally very thin to reduce its thermal mass, and may be approximately 4-6 times thicker than a wafer it is intended to support in the recessed region 13. The profile of the susceptor in plan view includes two mounting tabs 15, 17 and a tab 18 for an access port 19. The mounting tabs 15, 17 are secured to a front plate 20 in substantially orthogonal relationship, and the access port 19 includes an internal conduit 21, as shown in FIG. 2, for placement of a thermocouple, as later described herein. The front plate 20, as shown in FIG. 3, includes a water-cooling conduit distributed therethrough (not shown) between inlet 23 and outlet 36 connectors to maintain the front plate and any temperature-measuring circuitry 12 attached thereto at cool operating temperature, and also includes a vacuum connector 27 for vacuum attaching a wafer to the susceptor 9 via internal conduit 26, as later described herein. The front plate 20 includes a protrusion 29 and gasket 41, as shown in FIG. 2, for fluid-tight attachment of the assembly to the flange of a processing chamber.

The access port or ports 19 may be machined within the thickness of the susceptor to extend as an internal conduit 21 substantially to a location immediately adjacent the center of a wafer disposed within the recessed region 13. Conduits or grooves 33 extend from the conduit 26 to the surface of the recessed region 13 in order to establish a pressure differential across a wafer 10 positioned in the recessed region 13 as a source of vacuum is connected to the access port 27. In addition, a thermocouple 35 is positioned within the internal conduit 21 with the active junction positioned near the end of the conduit 21 in close proximity substantially to the center of a vacuum-attached wafer 10. In this way, the temperature of the wafer 10 may be accurately measured by thermal conduction through the graphite susceptor 9 to the thermocouple 35 with the components in thermal equilibrium. The electrical output of the thermocouple 35, or other thermal sensor such as thermally-sensitive resonator, or the like, is accurately calibrated and displayed as a temperature reading on a display unit 37 positioned on the front plate 20. Also, such output may be supplied to a control system, for example, for terminating the radiative heating of a wafer in response to the wafer attaining a selected temperature.

Referring now to the sectional view of FIG. 2, there is shown a side-sectional illustration of the susceptor 9 with a semiconductor wafer 10 positioned within the recessed region 13 and attached thereto by the vacuum drawn against the back side of the wafer through the internal conduit 26 and the access port 27. In addition, the thermocouple 35 is disposed at the end of the internal conduit 21 in close proximity substantially to the center of an attached wafer 10. The front plate 20 includes a protrusion 29 and gasket 41 near the rear-side perimeter of the plate 20 for forming a fluid-tight seal against the flanged end 31 of the processing chamber 43. This chamber 43 may contain an atmosphere of selected gases at ambient or elevated temperature, and may be surrounded by high-intensity, non-coherent light sources 45 for irradiating the wafer 10 and susceptor 9 through the quartz walls 47 of the processing chamber 43. An optical pyrometer 49 may be positioned outside the processing chamber 43 to sense the radiant flux within a narrow field of view 50 emerging from the surface of the wafer. Of course, other sources of radiant flux including the chamber walls 47, susceptor 9, reflections, and the like, affect the accuracy of the temperature measurement by the optical pyrometer. Therefore, the operating conditions for mass processing of wafers, including temperature, gases present, spacing of wafer from the chamber walls 47, and the like, are all replicated as accurately as possible when the susceptor 9 and representative wafer 10 (with associated circuit patterns) is inserted into the chamber 43.

FIG. 3 illustrates the front view of the plate 20 including the display 37 and the cooling-water connection 23, 36 and vacuum connectors 27. Water may circulate through conduits in the front plate 20 to provide appropriate cooling. Of course, the output of the thermocouple 35 may be measured and display as temperature in known manner. Thus, in operation, the measurement of wafer temperature may be calibrated accurately under substantially identical operating conditions using the wafer-supporting susceptor 9 and thermocouple 35 of the present invention to measure the actual temperature of a sample wafer, as displayed 37 on the front plate 20. Thereafter, the susceptor 9 and vacuum-attached wafer may be removed from the chamber 43 and stored safely as the chamber is prepared for mass processing of wafers (similar to the sample wafer that was attached to the susceptor) under processing conditions of spacing, gases, pressure, temperature, and the like, that are substantially identical to the conditions during calibration. Of course, the chamber 43 may include a light box for processing wafers in atmospheric environments behind protective quartz window, or the like.

Therefore, the apparatus and method of the present invention provides accurate conductive temperature measurement of a sample wafer under substantially identical operating conditions for wafers being processed in order to calibrate optical pyrometry measurements of temperature of the wafers being processed.

We claim:

1. A method of sensing the elevated temperature of a semiconductor wafer within a processing chamber, the method comprising the steps of:
   supporting the wafer on a thermally-conductive susceptor within the processing chamber;
   irradiating the surface of at least one of the wafer and susceptor within the processing chamber to elevate the temperature of the wafer and susceptor in substantial thermal equilibrium; and
   sensing the temperature at a location within the susceptor that is in substantial thermal equilibrium with the wafer.

2. The method according to claim 1 comprising the additional steps of:
   measuring radiation from the surface of the wafer;
   correlating the temperature sensed within the susceptor with the measurement of radiation from the surface of the wafer at least one temperature to establish a correlation factor between the temperature of the wafer and the radiation therefrom at least said one temperature;
   removing the susceptor and semiconductor wafer from within the chamber;
   supporting another substantially similar semiconductor wafer within the chamber;
   measuring the radiation from the surface of said another semiconductor wafer; and
   determining the temperature of said another semiconductor wafer within the chamber in response to the meausured radiation from the surface of said another semiconductor wafer modified by said correlation factor.

3. A method of sensing the elevated temperature of a semiconductor wafer within a processing chamber, the method comprising the steps of:
   supporting the wafer on a thermally-conductive susceptor within the processing chamber;
   irradiating the surface of at least one of the wafer and susceptor within the processing chamber to elevate the temperature of the wafer and susceptor in substantial thermal equilibrium;
   sensing the temperature at a location within the susceptor that is in substantial thermal equilibrium with the wafer;
   detecting the radiation from the surface of the wafer at the elevated temperature thereof within the processing chamber; and
   correlating the temperature sensed within the susceptor with the temperature associated with the measured radiation from the surface of the wafer and establishing the relationship there between for determining the temperature at the surface of a wafer within the processing chamber from measurement of the radiation from the surface of a wafer.

4. The method according to claim 3 in which the steps of irradiating and detecting performed on the semiconductor wafer are repeated on another semiconductor wafer supported within the chamber after the step of correlating the temperature sensed within the susceptor with the temperature associated with the measured radiation establishes the relationship therebetween at least one temperature to provide accurate temperature meausurements of said another semiconductor wafer in response to a measurement of radiation therefrom that is modified by said established relationship for determining the temperature at the surface of such another semiconductor wafer within the processing chamber from measurements of the radiation from the surface of such another wafer.

* * * * *